United States Patent
Hamada (10) Patent No.: US 10,199,617 B2
(45) Date of Patent: Feb. 5, 2019

(54) ASSEMBLED-BATTERY STACKER AND ASSEMBLED BATTERY

(71) Applicant: NIPPON STEEL & SUMITOMO METAL CORPORATION, Tokyo (JP)

(72) Inventor: Koichi Hamada, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 339 days.

(21) Appl. No.: 14/899,711

(22) PCT Filed: Jul. 23, 2014

(86) PCT No.: PCT/JP2014/069393
§ 371 (c)(1),
(2) Date: Dec. 18, 2015

(87) PCT Pub. No.: WO2015/012292
PCT Pub. Date: Jan. 29, 2015

(65) Prior Publication Data
US 2016/0141566 A1 May 19, 2016

(30) Foreign Application Priority Data
Jul. 26, 2013 (JP) .................. 2013-155097

(51) Int. Cl.
*H01M 2/10* (2006.01)
*H01M 10/04* (2006.01)
*H01M 10/6554* (2014.01)

(52) U.S. Cl.
CPC ....... *H01M 2/1016* (2013.01); *H01M 2/1022* (2013.01); *H01M 2/1077* (2013.01); *H01M 10/0481* (2013.01); *H01M 10/6554* (2015.04)

(58) Field of Classification Search
CPC ........ H01M 2/02; H01M 2/0245; H01M 2/10; H01M 2/1061; H01M 2/1077; H01M 2/1083; H01M 2/1094; H01M 2/1016; H01M 2/1022; H01M 10/0481; H01M 10/6554
See application file for complete search history.

(56) References Cited

U.S. PATENT DOCUMENTS

| | | | | |
|---|---|---|---|---|
| 5,441,824 A | * | 8/1995 | Rippel .............. | H01M 10/0413 429/152 |
| 5,663,008 A | | 9/1997 | Shimakawa et al. | |
| 5,766,801 A | * | 6/1998 | Inoue ................. | H01M 2/0245 429/159 |
| 2010/0190049 A1 | * | 7/2010 | Kawase ............. | H01M 2/1077 429/159 |
| 2011/0177377 A1 | | 7/2011 | Dube | |
| 2012/0270095 A1 | * | 10/2012 | Kim ................... | H01M 2/1077 429/159 |
| 2013/0034764 A1 | * | 2/2013 | Ochi .................. | H01M 2/0262 429/99 |
| 2013/0189559 A1 | | 7/2013 | Giere | |
| 2013/0288105 A1 | * | 10/2013 | Niedzwiecki ....... | H01M 2/1077 429/156 |

FOREIGN PATENT DOCUMENTS

| | | |
|---|---|---|
| CN | 1134041 A | 10/1996 |
| CN | 103119750 A | 5/2013 |
| CN | 103165835 A | 6/2013 |
| DE | 10 2011 109 934 A1 | 2/2013 |
| EP | 2 819 210 A1 | 12/2014 |
| JP | 09120808 A | 5/1997 |
| JP | 2008282582 A | 11/2008 |
| JP | 2010092610 A | 4/2010 |
| JP | 2012059581 A | 3/2012 |
| JP | 2013008479 A | 1/2013 |
| JP | 2013122819 A | 6/2013 |
| JP | 2013122820 A | 6/2013 |
| JP | 2013145686 A | 7/2013 |
| WO | WO 2013/163138 A1 | 10/2013 |
| WO | 2014083789 A1 | 6/2014 |

OTHER PUBLICATIONS

High Strength Steels, Automotive Worldwide, Arcelor Mittal, Aug. 2009 (Year: 2009).*
Chinese Office Action and Chinese Search Report, dated Jan. 23, 2017, for corresponding Chinese Application No. 201480034798.X, with English translations.
Extended European Search Report, dated Feb. 17, 2017, for corresponding European Application No. 14829816.9.
International Search Report dated Oct. 14, 2014 issued in corresponding International Application No. PCT/JP2014/069393.

* cited by examiner

*Primary Examiner* — Anca Eoff
(74) *Attorney, Agent, or Firm* — Birch, Stewart, Kolasch & Birch, LLP (57) ABSTRACT

This assembled-battery stacker includes: a pair of end plates which is formed from a first steel sheet and is arranged at both ends of a battery block in the thickness direction; a connecting member which is formed from a second steel sheet and mutually connects the pair of the end plates; wherein the end plate includes: a bottom wall part that faces an end face of the battery block in the thickness direction; and a side wall part that extends from both sides of the bottom wall part to the thickness direction and covers a part of a lateral face of the battery block; and wherein the connecting member is arranged in order for the connecting member to overlap at least a part of the side wall part.

8 Claims, 7 Drawing Sheets

ASSEMBLED-BATTERY STACKER AND ASSEMBLED BATTERY

TECHNICAL FIELD OF THE INVENTION

This application is a national stage application of International Application No. PCT/JP2014/069393, filed on Jul. 23, 2014, which claims priority to Japanese Patent Application No. 2013-155097 filed on Jul. 26, 2013, each of which is incorporated herein by reference in its entirety.

This invention relates to assembled-battery stacker and assembled-battery.

RELATED ART

In this specification, 'battery block' means 'a plurality of plate batteries stacked in the thickness direction'. 'The thickness direction of battery block' means 'the stacked direction of a plurality of plate batteries'. 'Assembled-battery' means 'a component in which a battery block is fixed by an assembled-battery stacker'.

Generally, assembled-battery stackers, for example, include a pair of end plates which is provided at both ends of the thickness direction of battery block and a connecting member which extends to the thickness direction of the battery block and connects the pair of the end plates.

Structure and strength enough to stably hold the battery block are required for the assembled-battery stackers. After repetitive charge and discharge, the battery block is deteriorated and expands. Accordingly, it is required for the assembled-battery stackers to endure the stress caused when the battery block expands.

Patent Document 1 discloses an assembled-battery including a metal band (a connecting member), which connects a pair of end plates made of Aluminum, Aluminum alloy, or rigid plastic as raw materials. Reinforced rib, whose shape is like a flat plate, is integrated on the pair of the end plates as one member in order to enhance the bending strength of the end plates. When Aluminum or Aluminum alloy is used as the raw material of the end plate, the end plate and the reinforced rib are integrally molded by a die casting method.

Patent Document 2 discloses an assembled-battery in which an end plate and a holder member (connecting member) are formed from synthetic resin by an injection molding method.

Patent Document 3 discloses an assembled-battery in which a connecting member, instead of an end plate, is provided on each lateral face of a plurality of batteries, and with the help of the connecting member, a connecting rod is provided on the plurality of the batteries. The connecting rod is inserted into through holes formed on the respective connecting member.

Patent Document 4 discloses an integrated battery module unit constructed by arranging a pair of battery modules in series. In this integrated battery module, a first end plate arranged in between the pair of the battery nodules, and two of second end plates arranged at the both ends of the pair of the battery modules sandwich the pair of the battery modules. The second end plate is integrally formed with a connection part, and a tip end of the connection part is fixed on the lateral face of the first end plate.

Patent Document 5 discloses a storage battery in which a battery block is fixed by a pair of end plates, and a binding band which connects the lateral face of the pair of the end plates.

PRIOR ART DOCUMENT

Patent Document

[Patent Document 1] Japanese Unexamined Patent Application, First Publication No. 2008-282582

[Patent Document 2] Japanese Unexamined Patent Application, First Publication No. 2012-59581

[Patent Document 3] Japanese Unexamined Patent Application, First Publication No. 2013-8479

[Patent Document 4] Japanese Unexamined Patent Application, First Publication No. 2013-122820

[Patent Document 5] Japanese Unexamined Patent Application, First Publication No. H9-120808

DISCLOSURE OF THE INVENTION

Problems to be Solved by the Invention

However, in the assembled-battery disclosed in Patent Document 1, when Aluminum or Aluminum alloy is used as the raw material of the end plate, the end plate is made by the die casting method. Accordingly, the processing cost of the end plate increases, and it is difficult to make the end plate thinner, whereby the end plate inevitably becomes heavier in weight. When rigid plastic is used as the raw material of the end plate, the processing cost of the end plate becomes high because a reinforced rib has to be formed. Further, the cost of raw materials becomes high because a large amount of rigid plastic is used in order to maintain the necessary strength. Furthermore, if plastic is used for the end plates, the heat dissipation property of the assembled-battery deteriorates.

In the assembled-battery disclosed in Patent Document 2, since the end plates are formed from synthetic resin, for the same reason, the cost of raw materials becomes high and the heat dissipation property of the assembled-battery deteriorates.

In the assembled-battery disclosed in Patent Document 3, the production cost becomes high because every battery is required to provide a connecting member.

In the battery module unit disclosed in Patent Document 4, the first end plate is constructed by drawing materials made of Aluminum. Accordingly, the processing cost of the first end plate becomes high and the weight of the end plate is heavy since it is difficult to make the end plate thinner. Furthermore, in the battery module unit disclosed in Patent Document 4, expansion of the battery module is controlled by a block fixation member, which is other than the end plate and is fixed on the upper surface of a supporting member. That is, the end plate used in Patent Document 4 is not sufficient to control the expansion of the battery module.

In a storage battery disclosed in Patent Document 5, since the structure of the storage battery has a binding band which is fixed on the lateral face of a pair of end plate, the stress concentration is caused when the battery expands in the vicinity of the fixation member. Accordingly, it is necessary to increase the thickness and weight of the end plate respectively, in order to secure the required strength.

The objective of the present invention is to provide an assembled-battery stacker and an assembled-battery that realize not only the required strength but also the reduction of weight, the space saving, the reduction of the production cost, and the excellent heat dissipation property, in comparison with the conventional assembled-battery stacker.

Means Used to Solve the Problem

The gist of the present invention is as follows.

(1) A first aspect of the present invention is an assembled-battery stacker configured to contain a battery block in which a plurality of plate batteries are stacked in a thickness direction. The assembled-battery stacker includes: a pair of end plates which is formed from a first steel sheet and is arranged at both ends of the battery block in the thickness direction; a connecting member which is formed from a second steel sheet and mutually connects the pair of the end plates; wherein the end plate includes: a bottom wall part that faces an end face of the battery block in the thickness direction; and a side wall part that extends from the both sides of the bottom wall part to the thickness direction and covers a part of a lateral face of the battery block; and wherein the connecting member is arranged in order for the connecting member to overlap at least a part of the side wall part.

(2) In the assembled-battery stacker according to the above-described (1), the connecting, member that passes across the side wall part on an external surface of the end plate, may go around to the bottom wall part and may be fixed on the bottom wall part.

(3) In the assembled-battery stacker according to the above-described (1) or (2), a shape of the bottom wall part of the end plate may be rectangle when viewed from the thickness direction of the battery block, the side wall part may be formed along a pair of opposite sides of the bottom wall part, and the connecting member may be fixed in the vicinity of a corner part of the bottom wall part on the end plate.

(4) In the assembled-battery stacker according to any one of the above-described (1) to (3), a width W (mm) of the side wall part in the thickness direction of the battery block and a square measure S (mm$^2$) of the bottom wall part may satisfy the following equation (A).

$$0.1 \times S^{1/2} \leq W \leq 0.4 \times S^{1/2} \quad \text{equation (A)}$$

(5) In the assembled-battery stacker according to any one of the above-described (1) to (4), an opening part may be formed on the bottom wall part.

(6) In the assembled-battery stacker according to any one of the above-described (1) to (5), a first linear convex part that is expanded outward may be formed on both the bottom wall part and the side wall part of the end plate.

(7) In the assembled-battery stacker according to the above-described (6), a vent hole may be formed on the first linear convex part.

(8) In the assembled-battery stacker according to any one of the above-described (1) to (7), a second linear convex part that is expanded inward may be formed on both the bottom wall part and the side wall part of the end plate.

(9) In the assembled-battery stacker according to any one of the above-described (1) to (8), a tensile strength of the first steel sheet and the second steel sheet may be 590 MPa or more.

(10) A second aspect of the invention is an assembled-battery including: a battery block in which a plurality of plate batteries are stacked in the thickness direction; and the assembled-battery stacker according to any one of (1) to (9) that is configured to contain the battery block.

Effects of the Invention

According to the above-described structure, since the end plate and the connecting member are formed from respective steel sheets, the end plate and the connecting member can be formed thinner than a case where the end plate and the connecting member are made by a die casting method with metals such as Aluminum, and an Aluminum alloy. Further, the thickness for realizing the required strength can be extremely thinner than a case where a connecting member is formed from resin. Accordingly, by the present invention, the weight saving of an assembled-battery stacker is realized, the cost of raw materials is reduced, and the downsizing of assembled-battery (space saving) is attained. Since heat conductivity of steel is higher than that of resin, it is possible to obtain an excellent heat dissipation property.

Furthermore, the productivity of the end plate and the connecting member, which are formed from respective steel sheet, can be enhanced by introducing press working. The end plate formed with a bottom wall part and a side all part can be produced by a bending process performed on a flat steel sheet of predetermined shape. Thus, the processing cost can be reduced.

In comparison with the other parts, high stress is applied to the end plate, specifically to the transient part of the bottom wall part and the side wall part in the end plate, when a battery is expanded by the deterioration of the battery. According to the present invention, the transient part is constructed by a double structure of the end plate (at least a part of the side wall part) and the connecting member. Thus, the stress concentration in the vicinity of the transient part is relaxed by the double structure. Accordingly, even a steel sheet whose proof stress is low and/or thickness is thin can be applied to both the end pale and the connecting member.

EMBODIMENTS OF THE INVENTION

An assembled-battery stacker 10 according to an embodiment of the present invention will be explained as follows with the help of the attached drawings.

Figure 1:
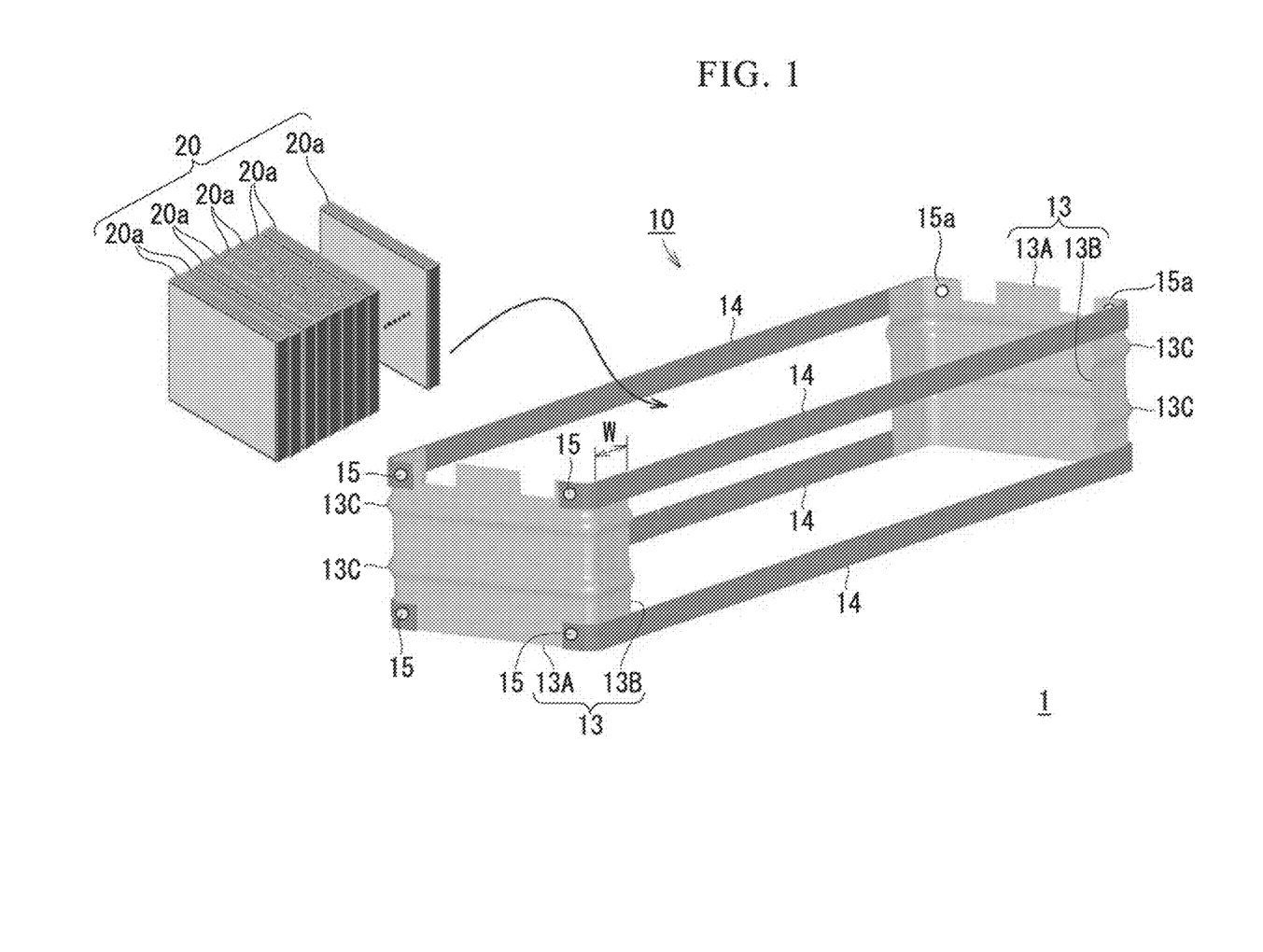
FIG. 1 is a disassembled perspective view of assembled-battery 1 including an assembled-battery stacker 10 according to an embodiment of the present invention.

FIG. 1 is a disassembled perspective view of an assembled-battery 1 including the assembled-battery stacker 10 of the embodiment of the present invention.

The assembled-battery stacker 10 according to this embodiment is a member of an assembled-battery 1, and is configured to contain and fix a battery block 20. The battery block 20 is a component in which plate batteries 20a are stacked in the thickness direction (stacking direction). The plate battery 20a is so called a square type battery, that is, the shape is rectangular when viewed from the thickness direction of battery block 20.

The assembled-battery stacker 10 of this embodiment includes a pair of end plates 13 arranged at the both ends of the battery block 20 in the thickness direction and a connecting member 14 that mutually connects the pair of the end plates 13. The end plates 13 and the connecting member 14 are respectively formed from steel sheets (first steel sheet and second steel sheet). The steel sheet may be, for example, a high strength steel sheet having a tensile strength of 590 MPa or more.

The end plate 13 includes a bottom wall part 13A that faces an end face of the battery block 20 in the thickness direction, and a side wall part 13B that extends from the both sides of the bottom wall part 13A to the thickness direction of the battery block 20 and covers a part of a lateral face of the battery block 20, which is in the vicinity of the end of the battery block 20.

The shape of the bottom wall part 13A is rectangular (includes almost rectangular) when viewed from the thickness direction of the battery block 20. The side wall part 13B is formed along a pair of opposite sides of the bottom wall part 13A. The side wall part 13B is not formed along the other pair of opposite sides of the bottom wall part 13A. That is, the end plate 13 has two of the side wall parts 13B.

The surface direction of the side wall parts 13B is almost perpendicular to the surface direction of the bottom wall part 13A. Thus, the shape of the end plate 13 is U shape (angular U shape) when viewed from the direction parallel to both the bottom wall part 13A and the side wall part 13B. The both width of the side wall parts 13B (the length of the expansion from the bottom wall part 13A) are the same.

The curvature radius R of a transient part (bending part) between the side wall part 13B and the bottom wall part 13A may be 3.0 mm to 10 mm. If the curvature radius is 3.0 mm or more, the interspace between the battery block 20 and the side wall part 13A and/or the interspace between the battery block 20 and the bottom wall part 13B is large enough to have a tunnel effect, whereby the heat dissipation property is enhanced because of the increased flowability of air in the interspace. However, it is not preferable if the curvature radius R be more than 10 mm because the effect of promoting heat dissipation property is saturated and the size of the assembled-battery 1 becomes large.

In the end plate 13, as shown in FIG. 1, a linear convex part 13C (first linear convex part) is formed by expanding on the surface side (on the outer side of the assembled-battery 1) from the bottom wall part 13A and to the side wall part 13B. In this case, in the end plate 13, the linear convex part 13C is formed on the surface side, and a channel corresponding to the linear convex part 13C is formed on the reverse side. In the bottom wall part 13A, the linear convex part 13C, which goes along a pair of opposite sides of the side wall part 13B and goes parallel to the other opposite side, further, extends to the end of the side wall part 13B. In this embodiment, two of linear convex parts 13C are formed in one end plate 13.

A connecting member 14, which is belt type, passes across the side wall part 13B on an external surface of the end plate (the opposite surface side of battery block 20), goes around to the bottom wall part 13A, and is fixed on the bottom wall part 13A. In the end plate 13, the connecting member 14 is fixed on the bottom wall part 13A in the vicinity of the four corner parts respectively. That is, the assembled-battery stacker according to this embodiment is equipped with four connecting members 14. The four connecting members 14 extend in the thickness direction of the battery block 20. The connecting member 114 is fixed on the bottom wall part 13A, for example, by a screw 15 and a nut 15a. Instead of the screw 15 and the nut 15a, a rivet may be used.

In an almost cuboid-shaped frame, which is configured by the end plate 13 and the connecting member 14, a plurality of plate batteries 20a can be contained with less interspace. Since the battery block 20 is supported by the pair of the bottom wall parts 13A, it is not necessary to fix each of the plate batteries 20a with the connecting members etc., thus, conventional batteries can be used without processing them.

The end plate 13 and the connecting members 14 are respectively formed from different steel sheets. Thus, the end plate 13 and the connecting members 14 can be made thinner than a case where the end plate 13 and the connecting members 14 are made by die casting method with metallic materials such as Aluminum or Aluminum alloy. Furthermore, the thickness required to attain the necessary strength of the end plate 13 and the connecting members 14 can be made extremely thinner than a case where the end plate 13 and the connecting members 14 are formed from resin.

If the force applied to the end plate 13 is, for example, 8000 N, the thickness of the end plate 13 can be, for example, 2.3 mm, and the thickness of the connecting member 14 can be, for example, 1.8 mm. However, if the end plate is made by die casting method with metallic materials such as Aluminum or Aluminum alloy, the thickness of the end plate 13 is 15 mm. If the end plate is made by resin, the thickness should be thicker in order to attain the necessary strength.

Accordingly, with the assembled-battery 1 employing the assembled-battery stacker 10 according to this embodiment, in comparison with the conventional assembled-batteries, it is possible to achieve the reduction of the weight, the cost down of raw materials, and the downsizing of the assembled-battery (space saving), with respect to the end plate 13 and the connecting members 14. Suppose that the end plate is, for example, made by die casting, method with Aluminum and that the total weight of assembled-battery is, for example, 1800 g, the weight of the assembled-battery 1 is 1000 g if the end plate is exchanged with the end plate 13 explained in FIG. 1. That is, not less than 40 weight reduction can be attained.

Since the end plate 13 is formed with a linear convex part 13C, the stiffness of the end plate 13 can be enhanced even if the end plate 13 is formed from thin steel sheet. More precisely, since the end plate 13 is formed with a the linear convex part 13C, high stiffness to the bending force, applied to the end plate 13 in the direction perpendicular to the extending direction of the linear convex part 13C, is obtained.

Furthermore, the heat dissipation property is improved because the surface area of the end plate 13 becomes large according to the linear convex part 13C.

In the assembled-battery 1, a force, caused by the tension of the connecting member 14, when the battery block 20 expands due to the deterioration thereof, is applied to the bottom wall part 13A of the end plate 13. The direction of the force applied to the end plate 13 is in the direction perpendicular to the extending direction of the linear convex part 13C. Thus, the existence of the linear convex part 13C effectively withstands the force from the end plate 14 caused by the tension of the connecting member 14. That is, the bottom wall part 13A is difficult to be deformed by the tension of the connecting member 14.

The heat conductivity of a steel sheet is higher than that of resin. The heat dissipation property of the assembled-battery 1 is enhanced because the end plate 13 and the connecting member 14 are formed from different steel sheets, respectively. The heat dissipation property of the assembled-battery 1 is enhanced if the connecting member 14 is narrow.

Figure 2:
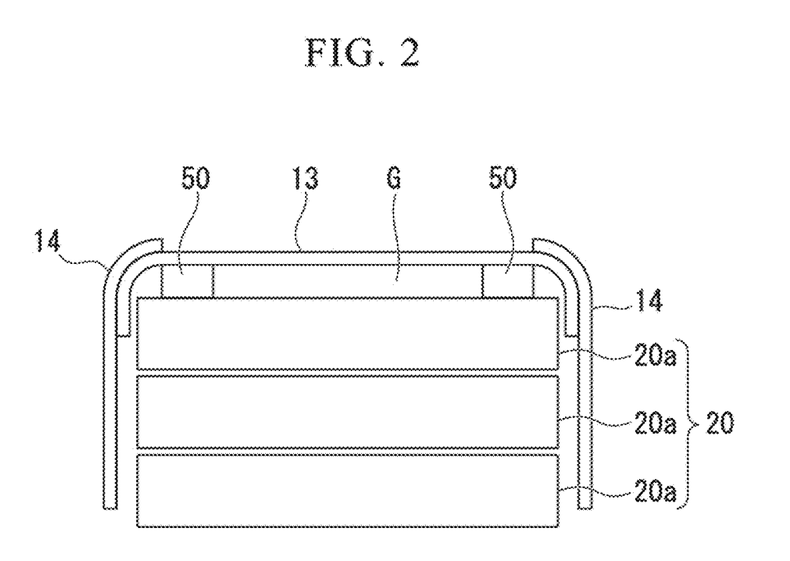
FIG. 2 is a schematic partial plan view of modification of the present invention wherein a spacer 50 is arranged between the end plate 13 and the battery block 20.

In between the end plate 13 and the battery block 20, as shown in the modification described in the schematic partial plan view of FIG. 2, it is preferable in view of the improvement of the heat dissipation property to have the interspace G of 1 mm to 10 mm in the thickness direction of the battery block 20 excluding the spacer part of 5% to 20% in area ratio. In addition, since steel has high strength, the battery block 20 can be held with the help of the spacer 50.

The end plate 13 may be produced as follows.

A plate steel sheet 100, whose plate shape corresponds to the end plate 13, is prepared. Then, the steel sheet 100 is pressed so as to form the linear convex part 13C, and is bent so as to form the bottom wall part 13A and side wall part 13B.

Figure 3:
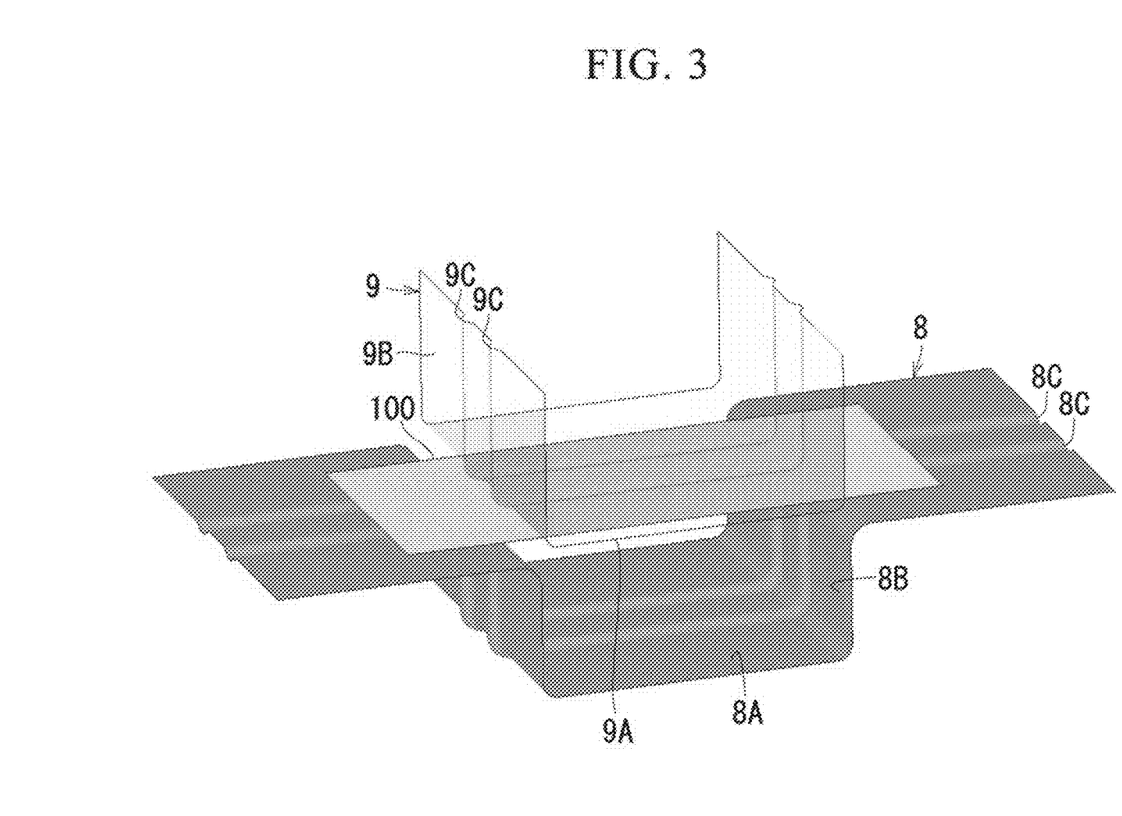
FIG. 3 is a schematic perspective view for explaining the method of forming an end plate 13 from a steel sheet 100 by press working.

FIG. 3 is a perspective view showing the method of press forming the end plate 13.

In this method, a metallic die, which is configured to contain a lower die 8 and an upper die 9 is used. In FIG. 3, the shape in the vicinity of machined surface of lower die 8 and the upper die 9 is only described. A concave part is formed in the lower die 8. The inside of the concave part contains an almost flat bottom surface 8A and an almost flat side surface 8B. The side surface 8B is substantially perpendicular to the bottom surface 8A. In the lower die 8, two of channels 8C are formed from one side of the concave part to the inside of the concave part and the other side of the concave part.

The upper die 9 has a convex part which is a complemental shape of the concave part of the lower die 8. The surface of the convex part contains an almost flat top surface 9A, which corresponds to the bottom surface 8A of the lower die 8, and almost flat side surface 9B, which corresponds to the side surface 8B of the lower die 8. The side surface 9B is almost perpendicular to the top surface 9A. Two of projections 9C, which correspond to the channels 8C formed on the lower die 8, are formed on the side surface 9B of one side of the top surface 9A, the top surface 9A and the other side surface 9B of the other side of the top surface 9A.

The process of making the end plate 13 by the lower die 8 and the upper die 9 is as follows. In the first place, a plate shape steel sheet 100 is set on the lower die 8 so that it is on the one upper surface side and the other upper surface side of the concave part. That is, the length of the steel sheet 100 is longer than the width of the concave part. However, the length of the steel sheet 100 that is outside the concave part of the lower die 8 is less than the depth of the concave part of the lower die 8. A plate shape steel sheet 100 may be obtained by, fir example, punching a large steel sheet.

In the second place, the convex part of the upper die 9 is inserted into the concave part of the lower die 8, and the steel sheet 100 is pressed by the lower die 8 and the upper die 9. In the steel sheet 100, the part sandwiched by the bottom surface 8A and the top surface 9A becomes the bottom wall part 13A, and the part sandwiched by the side surface 8B and the side surface 9B becomes the side wall part 13B. Since the side surface 8B and the side surface 9B are substantially perpendicular to the bottom surface 8A and the top surface 9A, respectively, the steel sheet 100 is bent so that the surface direction of the side wall part 13B is substantially perpendicular to the surface direction of the bottom wall part 13A. In addition, in the steel sheet 100, the part sandwiched by the channel 8C and the projections 9C becomes the linear convex, part 13C.

In this way, by press working, the end plate 13 can be formed from a steel sheet extremely easily. In this press working, the end plate is produced in a shorter time than a case where a metallic material is formed by die east method, or resin is formed by injection molding. In the same way, the connecting member 14 can be produced from a plate shape steel sheet in a shorter time by press working to form a bending part (the part correspond to the transient part between the side wall part 13B and bottom wall part 13A). Accordingly, the processing cost can be reduced because the end plate 13 and the connecting member 14 can be produced with high productivity.

Figure 4:
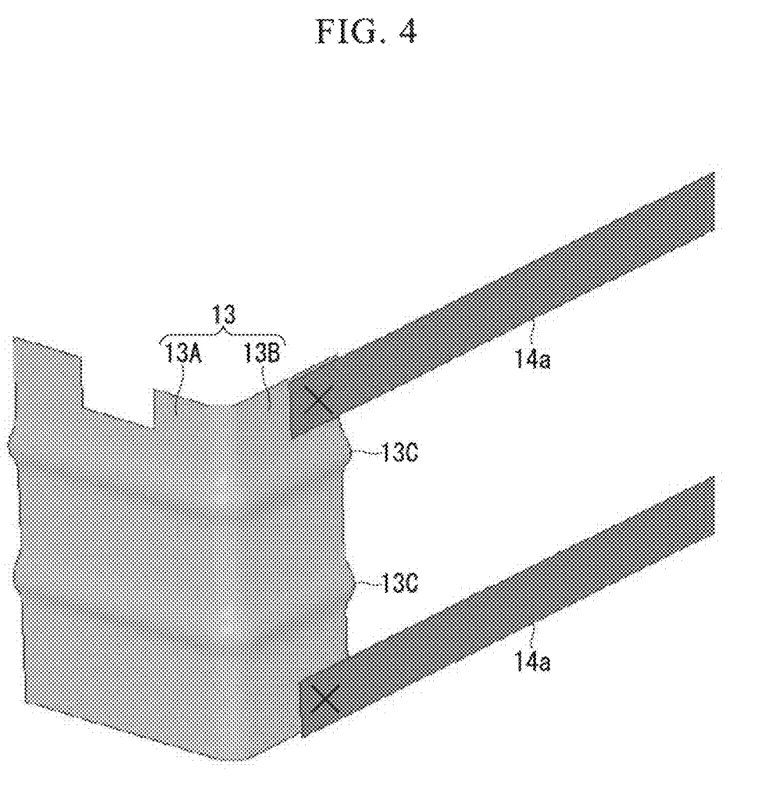
FIG. 4 is a schematic perspective view of modification of the present invention wherein a connecting member 14a is used.

FIG. 4 is a perspective view of a modification in which a connecting member 14*a* is used instead of the above-described connecting member 14.

In the modification shown in FIG. 4, the connecting member 14*a* does not go around the bottom wall part 13A and is fixed on the side wall part 13B. In FIG. 4, the fixed part is denoted as '×'. The terminal part of the side wall part 13B and the terminal part of the connecting member 14*a*, which are overlapped, construct double structure. By this double structure (overlapped structure), in the end plate 13, the stress concentration on the transient part between the side wall part 13B and the bottom wall part 13A caused by the expansion due to the deterioration of battery block 20 is relaxed in comparison with a case where the double structure is not constructed.

Meanwhile, in the assembled-battery stacker 10 of the embodiment shown in FIG. 1, not only the double structure constructed by the side wall part 13B and the connecting member 14 but also the double structure constructed by the bottom wall part 13A and the connecting member 14 are formed. By these double structures (overlapped structures), the stress concentration on the transient part between the side wall part 13B and the bottom wall part 13A caused by the expansion due to the deterioration of battery block 20 is further relaxed, and the breakage in the vicinity of the transient part rarely occurs.

The magnitude of the stress applied on the end plate 13 and the connecting member 14 (especially, the transient part between the bottom wall part 13A and the side wall part 13B, and a portion corresponding to the connecting member 14) varies depending on the width W of the side wall part 13B (the projection length from the bottom wall part 13A).

Figure 5:
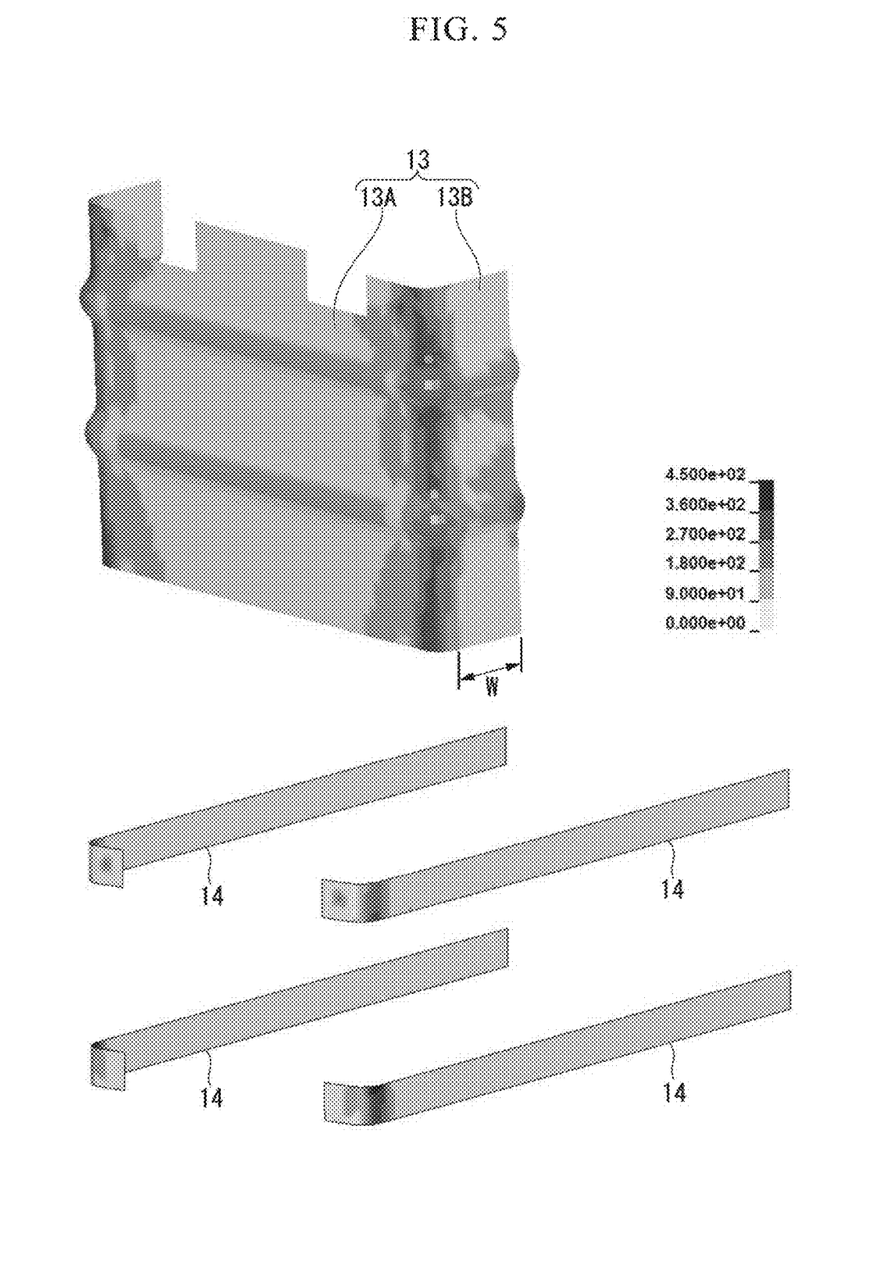
FIG. 5 is a schematic drawings showing distribution of stress on the end plate 13 and the connecting member 14.

In FIG. 5, the distribution of stress of the end plate 13 and the connecting member 14 are shown. The conditions of the simulation to obtain the distribution of stress are as follows.
(A) The width W of the side wall part 13B in the end plate 13: 20 mm,
(B) The thickness of the end plate 13: 2.3 mm,
(C) The material of the end plate 13: high strength steel sheet with a tensile strength of 590 MPa class,
(D) The material of the connecting member 14: high strength steel sheet with a tensile strength of 590 MPa class,
(E) The thickness of the connecting member 14: 1.8 mm,
(F) The width of the connecting member 14: 15 mm,
(G) The curvature radius of the transient part between the side wall part 13A and the bottom wall part 13B: 5 min,
(H) The width of the linear convex part 13C: 10 mm,
(I) The height of the projection in the linear convex part 13C: 3 mm,
(J) The force applied on the end plate 13: 7500 N applied perpendicular to the inside wall of the assembled-battery 1 in the bottom wall part 13A.

It should be noted that the width W of the side wall part 13B, which is the length of the flat part of the side wall part 13B, does not contain the length of the bending transient part between the bottom wall part 13A and the side wall part 13B.

Among the above-described conditions, '(A) The width W of the side wall part 13B' is varied within the range of 5 mm to 40 mm in order to evaluate the distribution of the stress. As a result, as for the end plate 13, inventors have found that the stress concentration is relaxed as the width W of the side wall part 13B increases if the width of the side wall part 13B is within the range of 5 mm to 20 mm and that the maximum of the stress applied to the each part of the end plate 13 is extremely reduced. However, only a little difference can be found in the distribution of the stress if the width of the side wall part 13B is more than 20 mm. As for the connecting member 14, the stress concentration is relaxed as the width W of the side wall part 13B increases if the width of the side wall part 13B is within the range of 5 mm to 30 mm and that the maximum of the stress applied to the each part of the connecting member 14 is extremely reduced. However, only a little difference can be found in the distribution of the stress if the width of the side wall part 13B is more than 30 mm.

Accordingly, in both the end plate 13 and be connecting member 14, the width W of the side wall part 13B is preferably 30 mm or more in order to decrease the maximum stress of the each part. However, it is preferable that the width W of the side wall part 13B be shorter for the purpose of the weight saving of the assembled-battery stacker 10. Thus, the width W of the side wall part 13B is preferably 30 mm.

According to the above-described results, it is found that a material with a low proof stress may be used as a raw material for the end plate 13 and the connecting member 14 if the width W of the side wall part 13B is long enough. The proof stress required differs based on the thickness of the end plate 13 and the connecting member 14.

In addition, the width W of the side wall part 13B may be set within a predetermined range based on the surface area S of the bottom wall part 13A. In this case, it is preferable that the width W (mm) of the side wall part 13B and the surface area S (mm$^2$) or the bottom wall part 13A satisfy the following equation (1).

$$0.1 \times S^{1/2} \leq W \leq 0.4 \times S^{1/2} \qquad \text{equation (1)}$$

It is preferable that the width W of the side wall part 13B be $0.1 \times S^{1/2}$ or more because the stress caused by the expansion due to the deterioration of battery block 20 can be relaxed.

However, the effect of relaxing the stress caused by the expansion due to the deterioration of battery block 20 is saturated if W is more than $0.4 \times S^{1/2}$. Accordingly, W is preferably not more than $0.4 \times S^{1/2}$, in view of the reduction of the weight and the improvement of the heat dissipation property.

It should be noted that the surface area S of the bottom wall part 13A is the surface area of flat part of the external surface of surface area. That is, the surface area S of the bottom wall part 13A does not include the surface area of the bending transient part between the bottom wall part 13A and the side wall part 13B.

Figure 6:
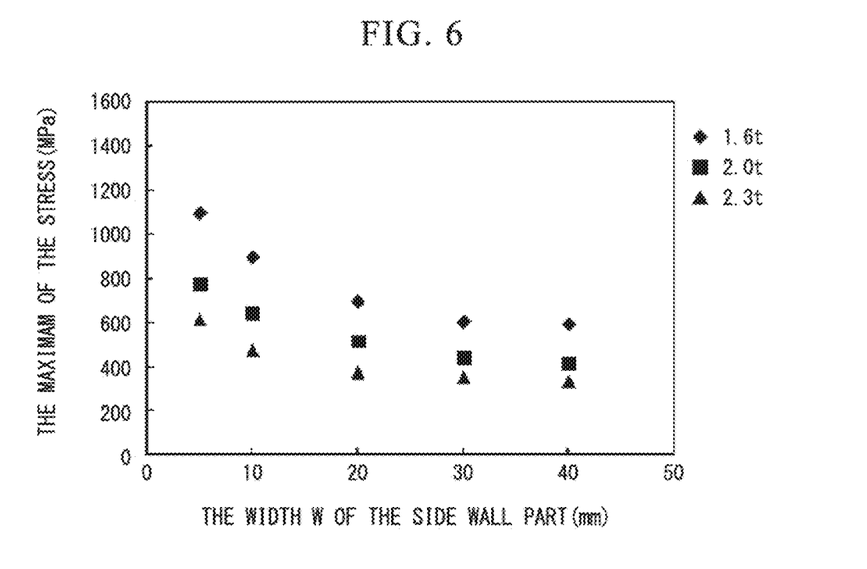
FIG. 6 is a diagram showing, with respect to the assembled-battery 1 of FIG. 1, the relationship between the width W of the side wall part 13B and the maximum stress caused on the end plate 13 when the thickness of the end plate is varied.

FIG. 6 is a diagram showing the relationship among the thickness of the end plate 13, the width W of the side wall part 13B, and the maximum stress (calculated by a simulation) caused on the end plate 13. The thickness is set such as 1.6 mm, 2.0 mm and 2.3 mm (denoted in FIG. 6 as '1.6t', '2.0t' and '2.3t', respectively).

The maximum stress decreases as the width W of the side wall part 13B increases or as the thickness of the side wall part increases. According to the result shown in FIG. 6, the maximum stress $S_{MAX}$(MPa) can be approximated by the width W (mm) of the side wall part and the thickness t (mm) as in equation (2).

$$S_{MAX} = A \times W^a \qquad \text{equation (2)}$$

Wherein A=b×t+c, a=−0.33, b=−1550, c=4500.

The coefficient in the equation (2), whose range is described in the following equations (3), (4) and (5), may be selected depending on the difference in the structure of the assembled-battery, $$-0.35 \leq a \leq -0.30 \qquad \text{equation (3)}$$

$$-1600 \leq b \leq -1.500 \qquad \text{equation (4)}$$

$$4400 \leq c \leq 4600 \qquad \text{equation (5)}$$

In the process of producing the assembled-battery 1 of the embodiment shown in FIG. 1, before fixing by the screw 15 and the nut 15a, if the shape of the connecting member 14 that overlaps with the end plate 13 is set to the complementary shape with the overlapping surface of the end plate 13, position matching of the end plate 13 and connecting member 14 when fixing by the screw 15 and the nut 15a can be carried out easily. This effect cannot be obtained in the case of the modification where a connecting member 14a is fixed with the side wall part 13B (shown in FIG. 4).

The present invention should not be limited to the above-described embodiment, and it is possible to make various modifications within the scope of the gist of the present invention. For example, the present invention can be varied. The variation of the present invention is as follows.

(1) In the above-described embodiment, two of the connecting members 14 are provided along one side of the bottom wall part 13A, however, three or more connecting members 14 may be installed.

(2) In the above-described embodiment, two of linear convex part 13C are formed on the end plate 13, however, any linear convex part 13C may not necessarily formed, one linear convex part 13C may be formed, and three or more linear convex parts 13C may be formed. As for the number of the linear convex parts 13C, the more the better in the case where the thin end plate 13 is used or the stress is applied on the end plate 13.

Figure 7:
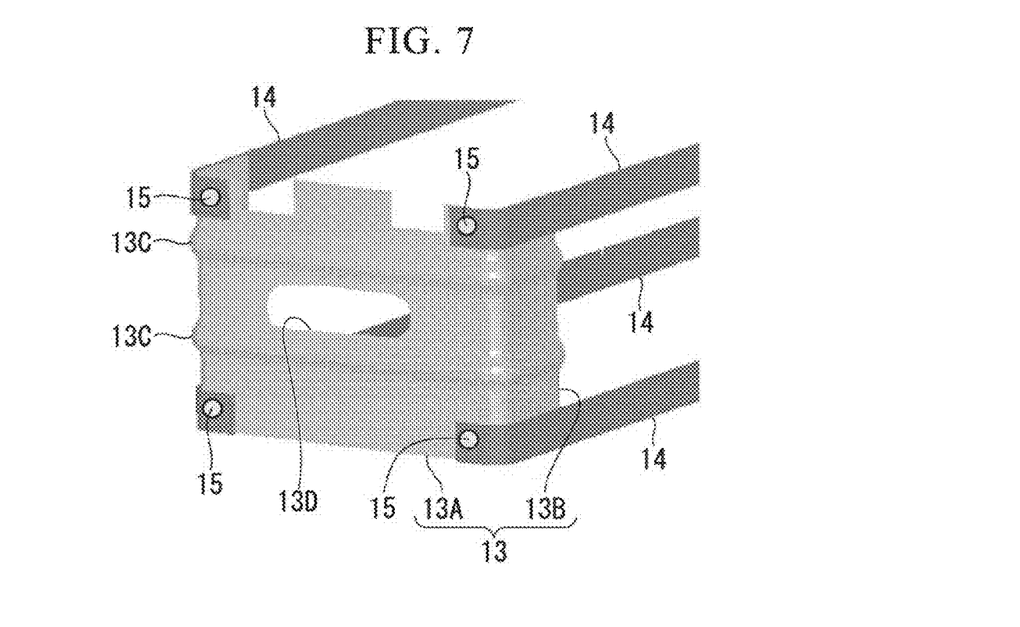
FIG. 7 is a schematic perspective view wherein an opening part 13D is formed on a bottom wall part 13A.

(3) As shown in FIG. 7, in the end plate 13, the opening part 13D may be formed on the part to which a large stress is applied. In this case, the heat dissipation property of the assembled-battery 1 is enhanced, and the reduction of the weight is realized by the reduction of materials.

Figure 8:
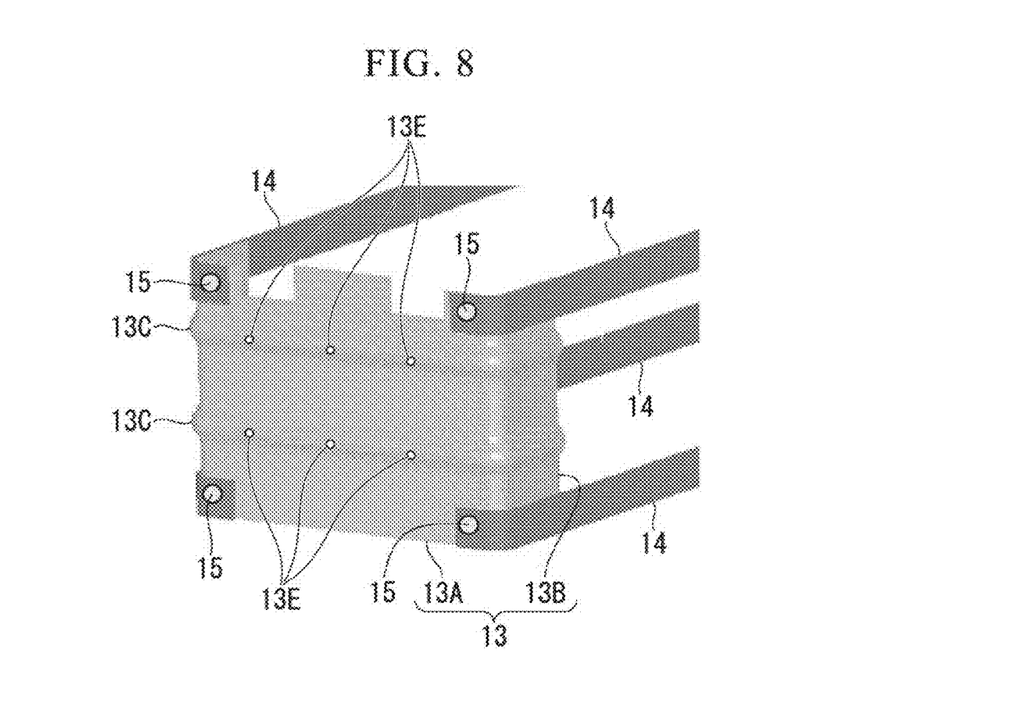
FIG. 8 is a schematic perspective view wherein a vent hole 13E is formed on a linear convex part 13C.

(4) As shown in FIG. 8, a vent hole 13E may be formed on the linear convex part 13C on the end plate 13. In this case, the heat dissipation property is further enhanced by a fin effect because another part from which the air can be flown away is constructed and the convex shape increase the surface area.

(5) In the above-described embodiment, the linear convex part 13C has a structure of expanding to outer side, however, the opposite structure wherein linear convex part has a structure of expanding to inner side (a second linear convex part) may be used. In this structure, interspace is formed between the end plate 13 and battery block 20 because the second linear convex part contacts battery block 20. Thus, the heat dissipation property can be enhanced because air flowability is improved by the interspace.

INDUSTRIAL APPLICABILITY

According to the present invention, it is possible to provide an assembled-battery stacker and an assembled-battery that realize not only the required strength but also the reduction of weight, the space saving, the reduction of the production cost, and the excellent heat dissipation property, in comparison with the conventional assembled-battery stacker.

BRIEF DESCRIPTION OF THE REFERENCE SYMBOLS

1 assembled-battery
10 assembled-battery stacker
13 end plate
13A bottom wall part
13B side wall part
13C linear convex part
13D opening part
13E vent hole
14 connecting member
15 screw
15a nut
20 battery block
20a plate battery
50 spacer
G interspace
100 steel sheet

What is claimed is:

1. An assembled-battery stacker configured to contain a battery block in which a plurality of plate batteries are stacked in a thickness direction, the assembled-battery stacker comprising:
   a pair of end plates which is formed from a first steel sheet having a tensile strength of 590 MPa or more and is arranged at both ends of the battery block in the thickness direction;
   a connecting member which is formed from a second steel sheet having a tensile strength of 590 MPa or more and mutually connects the pair of the end plates;
   wherein the end plate comprises:
   a bottom wall part that faces an end face of the battery block in the thickness direction; and
   a side wall part that extends from both sides of the bottom wall part to the thickness direction and covers a part of a lateral face of the battery block; and
   wherein the connecting member is arranged in order for the connecting member to overlap at least a part of the side wall part, and
   wherein the connecting member that passes across the side wall part on an external surface of the end plate goes around to the bottom wall part and is fixed on the bottom wall part.

2. The assembled-battery stacker according to claim 1, wherein:
   a shape of the bottom wall part of the end plate is rectangle when viewed from the thickness direction of the battery block,
   the side wall part is formed along a pair of opposite sides of the bottom wall part, and
   the connecting member is fixed in the vicinity of a corner part of the bottom wall part on the end plate.

3. The assembled-battery stacker according to claim 1, wherein a width W (mm) of the side wall part in the thickness direction of the battery block and a square measure S (mm$^2$) of the bottom wall part satisfy a following equation (1)

$$0.1 \times S^{1/2} \leq W \leq 0.4 \times S^{1/2} \qquad \text{equation (1).}$$

4. The assembled-battery stacker according to claim 1, wherein an opening part is formed on the bottom wall part.

5. The assembled-battery stacker according to claim 1, wherein a first linear convex part that is expanded outward is formed on both the bottom wall part and the side wall part of the end plate.

6. The assembled-battery stacker according to claim 5, wherein a vent hole is formed on the first linear convex part.

7. The assembled-battery stacker according to claim 1, wherein a second linear convex part that is expanded inward is formed on both the bottom wall part and the side wall part of the end plate.

8. An assembled-battery, comprising:
   a battery block in which a plurality of plate batteries are stacked in the thickness direction; and
   the assembled-battery stacker according to any one of claims 1 and 2-7 configured to contain the battery block.

* * * * *